United States Patent [19]

Sparks et al.

[11] Patent Number: 4,523,494
[45] Date of Patent: Jun. 18, 1985

[54] STEERING PRESSURE RESPONSIVE DIFFERENTIAL LOCK CONTROL SYSTEM

[75] Inventors: Gregory E. Sparks, Waterloo; David A. Larson, Cedar Falls, both of Iowa

[73] Assignee: Deere & Company, Moline, Ill.

[21] Appl. No.: 503,967

[22] Filed: Jun. 13, 1983

[51] Int. Cl.³ ............................................. F16H 1/445
[52] U.S. Cl. ..................................... 74/710.5; 74/711; 74/752 A; 180/6.2
[58] Field of Search ................ 74/710, 710.5, 711, 74/713, 752 A, 752 C, 752 D, 866; 192/4 A; 180/6.2

[56] References Cited

U.S. PATENT DOCUMENTS

| | | | |
|---|---|---|---|
| 2,722,134 | 11/1955 | Cabell | 74/472 |
| 2,830,670 | 4/1958 | Ferguson | 74/710.5 X |
| 2,874,790 | 2/1959 | Hennessey | 180/6.2 |
| 2,934,975 | 5/1960 | Algie | 74/650 |
| 3,138,970 | 6/1964 | Costa et al. | 74/711 |
| 3,292,720 | 12/1966 | Harvey | 180/6.2 |
| 3,400,610 | 9/1968 | Taylor et al. | 74/710.5 |
| 3,439,785 | 4/1969 | Hughson | 74/710.5 X |
| 3,446,320 | 5/1969 | Schott | 192/4 |
| 3,463,277 | 8/1969 | Allori et al. | 192/4 |
| 3,467,212 | 9/1969 | Doll | 180/6.2 |
| 3,498,427 | 3/1970 | Bingley | 192/13 |
| 3,640,360 | 2/1972 | Dollase | 192/4 A |
| 3,642,103 | 2/1972 | Schott | 192/4 A |
| 3,732,752 | 5/1973 | Louckes et al. | 74/710.5 |
| 3,788,166 | 1/1974 | Hart et al. | 74/710.5 |
| 3,845,671 | 11/1974 | Sharp et al. | 74/710.5 |
| 3,871,249 | 3/1975 | Jeffers | 74/711 |
| 3,945,475 | 3/1976 | Khatti | 74/710.5 X |
| 4,113,044 | 9/1978 | Williams et al. | 74/710.5 X |
| 4,218,938 | 8/1980 | Hattori | 74/710.5 |
| 4,347,760 | 9/1982 | Jewett | 74/710.5 |

Primary Examiner—Leslie A. Braun
Assistant Examiner—Dwight G. Diehl

[57] ABSTRACT

A differential lock control system includes a solenoid valve which operates hydraulic differential lock mechanisms in response to the operation of a control circuit. The control circuit includes normally closed, steering-responsive switches which open to unlock the differential when steering effort exceeds a certain level. The steering-responsive switches are operated by pins which are exposed to pilot pressures on either end of a valve spool of a conventional pilot-operated steering valve.

5 Claims, 2 Drawing Figures

STEERING PRESSURE RESPONSIVE DIFFERENTIAL LOCK CONTROL SYSTEM

BACKGROUND OF THE INVENTION

This invention relates to a control system which controls the locking and unlocking of a differential gear mechanism.

It is well known to provide vehicles, such as farm tractors, with differentials which can be selectively locked or unlocked. In a simple form, differential lock control systems are in use wherein a solenoid-operated differential lock control valve is controlled by a single, manually-operated floor switch. However, with such a system, the vehicle operator must continuously depress the floor switch in order to keep the differential locked. On both row-crop and four-wheel-drive (4WD) tractors with differential locks, a locked differential can interfere with the steering of the tractor. One solution to this problem, applicable to row-crop tractors, has been to unlock the differential in response to a left or right wheel brake application since the brakes are often used to assist the turning of a row-crop tractor. Such a system is described in U.S. Pat. No. 2,874,790 (Hennessey).

Another solution to this problem has been to control the locking of the differential as a function of the relative angle between mechanical components of the tractor steering system. An example of this is also shown in the Hennessey patent. Now, it is often necessary to operate a farm tractor in a sidehill situation wherein the tractor front end is constantly angled slightly uphill to compensate for the tendency of the tractor to drift in a downhill direction. In such a situation, when little steering effort is required to counteract the downhill drift, it would be desirable to have the differential remain locked. However, a steering angle dependent system, such as shown in the Hennessey patent, may automatically unlock the differential in this sidehill situation, regardless of whether such unlocking is desirable or necessary, if the steering angle exceeds the particular angle beyond which the differential is unlocked.

A solution to this latter problem in copending U.S. patent application Ser. No. 503,970, filed June 13, 1983 and assigned to the assignee of the present invention. However, the system described therein requires more than one relay and requires that an electrical circuit be completed through the components of a steering valve to obtain steering-responsive differential unlocking. Although operable, this is not an optimum solution because hydraulic fluid is an insulator and an open circuit electrical failure condition in the system could prevent a desired unlocking of the differential.

SUMMARY OF THE INVENTION

An object of the present invention is to provide a steering-responsive differential lock control system in which differential locking and unlocking is not dependent upon the making or breaking of an electrical circuit through the components of an hydraulic valve.

These and other objects are achieved by the present invention which includes a solenoid valve which operates hydraulic differential lock mechanisms in response to the operation of a control circuit. The control circuit includes normally closed, steering-responsive switches which open to unlock the differential when steering effort exceeds a certain level. The steering-responsive switches are operated by pins which are exposed to pilot pressures on either end of a valve spool of a conventional pilot-operated steering valve.

DETAILED DESCRIPTION

Figure 1:
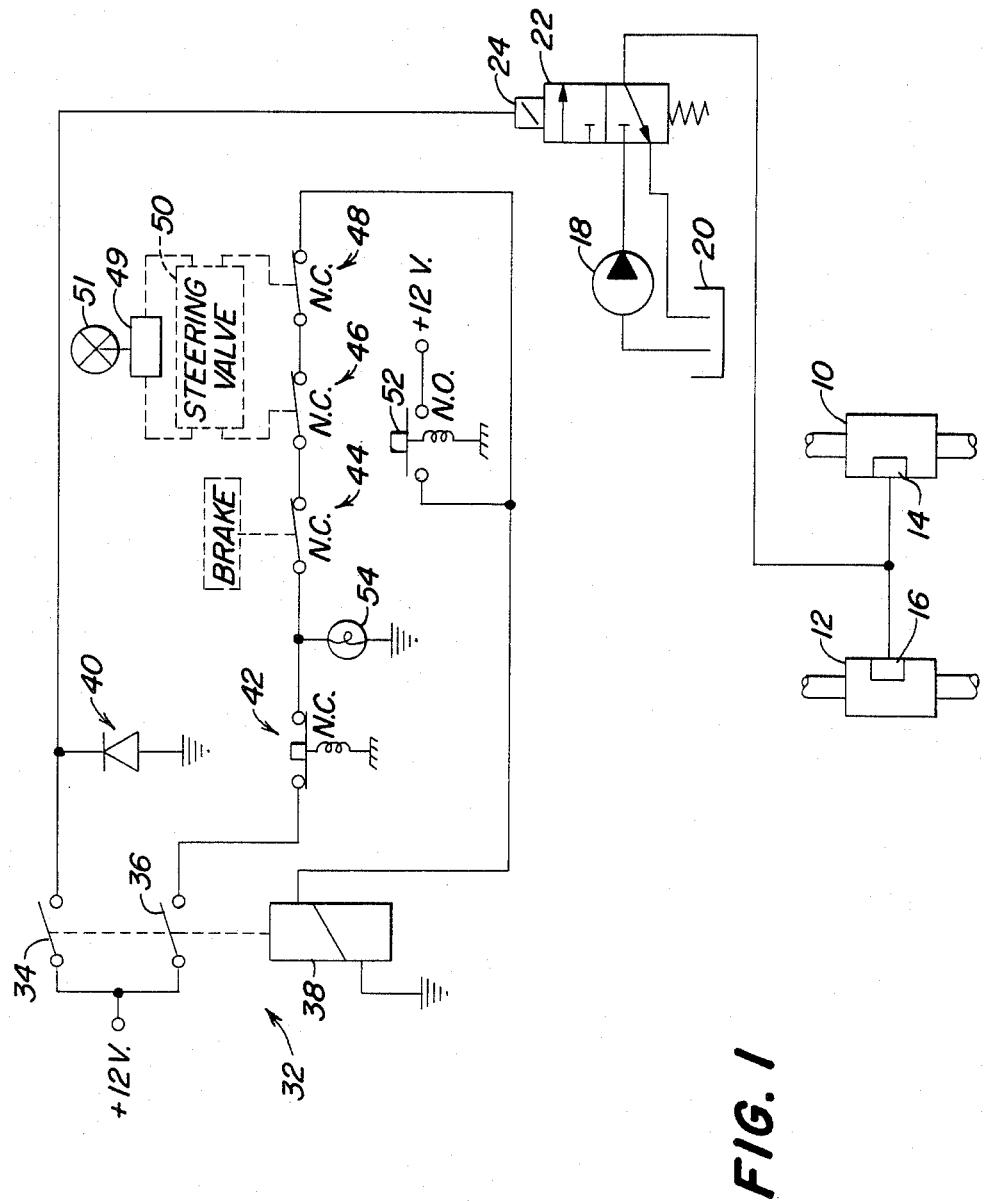
FIG. 1 is a simplified schematic diagram of a differential lock control system according to the present invention and FIG. 2 is a sectional view showing the detail of one of the steering-responsive switches of the present invention.

The power train of a four-wheel drive vehicle preferably includes front and rear conventional differential mechanisms 10 and 12 (interposed in the front and rear axles) with conventional locking mechanisms 14 and 16, preferably of the hydraulically-operated type, such as described in U.S. Pat. No. 3,292,720. Fluid communication between the locks 14 and 16, a pump 18 and a reservoir 20 is controlled by a conventional solenoid-operated, 2-way, 2-position valve 22 with solenoid 24.

The control circuit includes a battery or potential source (+12 v) and a normally open 2-pole relay 32 with switches 34 and 36 controlled by relay coil 38. The common side of switches 34 and 36 is coupled to +12 volts. The other side of switch 34 is coupled to solenoid 24 and is preferably coupled to ground via a diode 40 (for prevention of arcing when relay 32 opens). The other side of relay switch 36 is coupled to the relay coil 38 via series-connected switches 42, 44, 46 and 48.

Switch 42 is preferably a dash-mounted, normally closed, spring-loaded type switch. Switch 44 is preferably a normally closed switch which opens upon application of the vehicle brakes, such as described in U.S. Pat. No. 2,874,790. Switches 46 and 48 are preferably normally closed, snap-acting switches which are operatively coupled to a conventional pilot-operated steering valve 50 of the vehicle, as described later herein with reference to FIG. 2. The steering valve 50 operates in response to pilot pressure generated by a conventional metering pump 49 which is connected to the steering wheel 51.

A normally open, momentary contact switch 52 is coupled between +12 volts and the relay coil 38. An indicator lamp 54 has one side coupled between switches 42 and 44 and another side grounded so that lamp 54 can provide an indication of when relay 34 is closed and the differentials 10 and 12 are locked.

Figure 2:
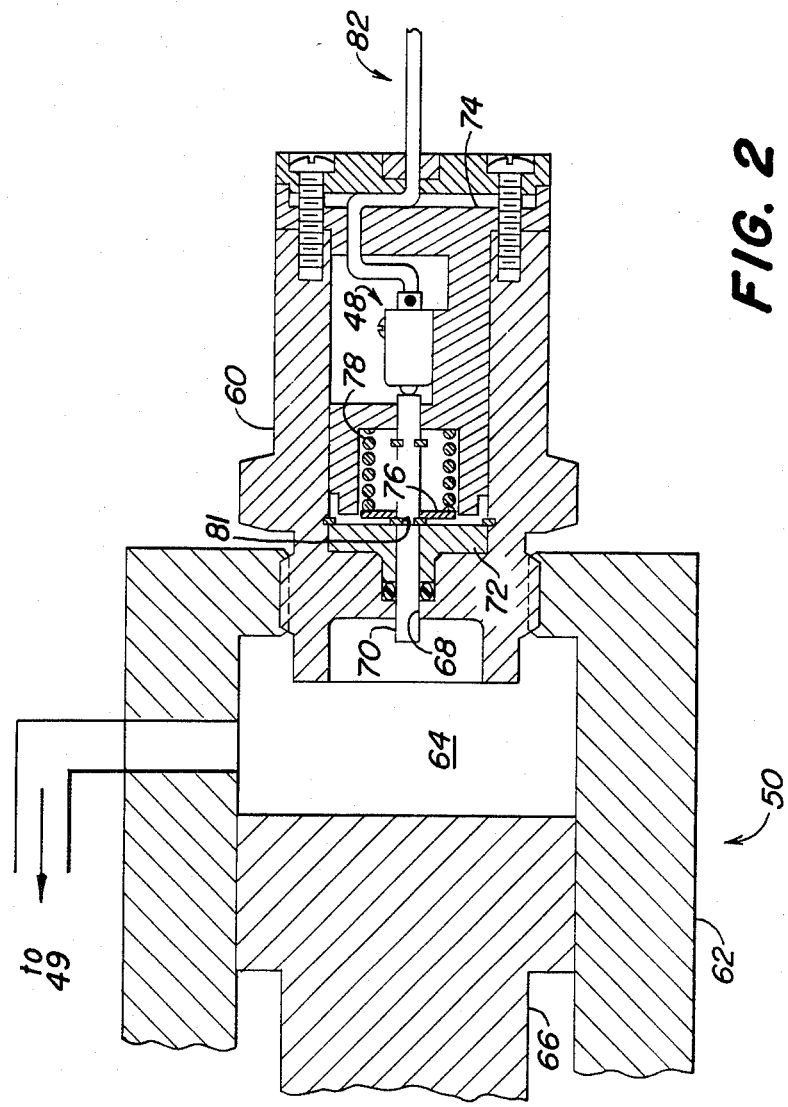

Referring now to FIG. 2, a hollow switch housing 60 is theadably attached to an end of the housing 62 of the steering valve 50 so as to be exposed to the pilot pressure which acts in chamber 64 on an end of the valve spool 66. The housing 60 has an axial bore 68 which slidably receives an actuator pin 70 which is also guided by a flanged part 72 and housing part 74. Pin 70 carries a disc-shaped spring stop 76. A coil spring 78 surrounds and urges pin 70 towards chamber 64 until stopped by an abutment provided by snap-ring 81. An end of pin 70 operatively engages the normally closed snap-acting switch 48, which can be a conventional Cherry subminiature switch. The electrical leads 82 connect the switch 48 with circuit 30. Structure similar to that shown in FIG. 2 is fixed at both ends of the steering valve 50, each structure containing one of the steering operated switches 46 and 48.

MODE OF OPERATION

To lock the unlocked differentials 10 and 12, the operator momentarily closes switch 52, thus energizing coil 38 and closing switches 34 and 36 so that solenoid 24 is energized via switch 34. When switch 52 is released, the relay is latched closed because coil 38 remains energized via switches 36 and 42-48. At this point, the differential can be unlocked by manually opening switch 42 or by a brake application which opens switch 44, which in both cases, de-energizes relay coil 38 and opens relay switches 34 and 36.

While the differentials are locked, the vehicle can be steered without unlocking the differential as long as the pilot pressure in chamber 64 remains below a predetermined threshold pressure, such as 260-360 psi, preferably corresponding to a steering wheel torque of 19-22 nt-m (newton-meters). This permits the operator to steer the tractor, in some cases, such as along the side of a hill, without unlocking the differential. However, the locked condition of the differential may interfere with the steering of the tractor, in which case, the operator will normally react by applying more torque to the tractor steering wheel which, in turn, increases the pilot pressure on one side of valve spool 66. When this torque reaches 19-22 nt-m, then the pilot pressure will reach the level required to move the actuator pin 70 to open the corresponding one of switches 46 or 48. This de-energizes the relay coil 38, opens switches 34 and 36, de-energizes solenoid 24 and causes valve 22 to unlock the differentials.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a vehicle having an hydraulic steering system including a pilot pressure-operated steering valve, a differential and a steering-responsive differential lock control system, including locking means for locking and unlocking the differential, the improvement wherein the steering-responsive differential lock control system comprises:
a pressure-operated normally closed switch mounted at an end of a housing of the steering valve and acted upon by a pilot pressure which acts upon an end of a valve spool of the steering valve, the pressure-operated switch open to unlock the differential when the pilot pressure exceeds a predetermined pressure.

2. The invention of claim 1, wherein the control system comprises:
a further pressure-operated switch mounted at an opposite end of the housing of the steering valve and operated upon by a pilot pressure which acts upon an opposite end of the valve spool.

3. The control system of claim 2, further comprising:
a potential source;
a normally open latching relay having a double pole switch having a common side of both poles connected to the potential source, the other side of one pole being coupled to the locking means, having a relay coil for closing the double pole switch, the relay coil having a first terminal grounded and a second terminal, the second terminal being coupled to the other side of the other pole via the pressure-operated switches, the pressure-operated switches being connected in series, the control system controlling the locking means in response to operation of the relay and the pressure-operated switches.

4. The control system of claim 3, further comprising:
a normally open momentary contact switch coupled between the potential source and the second coil terminal.

5. The control system of claim 1, wherein the pressure-operated switch comprises:
a hollow switch housing mounted at an end of the steering valve housing and having a bore which opens into a pilot chamber of the steering valve;
a pin slidable in the bore and exposed to pilot pressure in the pilot chamber;
a snap-acting switch mounted in the switch housing and operatively engaging an end of the pin; and
resilient means biased to urge the pin away from the snap-acting switch and in opposition to the pilot pressure, the pin moving to toggle the snap-acting switch when the pilot pressure exceeds the predetermined pressure.

* * * * *

UNITED STATES PATENT AND TRADEMARK OFFICE
CERTIFICATE OF CORRECTION

PATENT NO. : 4,523,494

DATED : 18 June 1985

INVENTOR(S) : Gregory Evan Sparks et al

It is certified that error appears in the above-identified patent and that said Letters Patent is hereby corrected as shown below:

Column 4, line 7, delete "open" and insert -- opening --.

Signed and Sealed this

Twenty-fourth Day of June 1986

[SEAL]

Attest:

DONALD J. QUIGG

Attesting Officer

Commissioner of Patents and Trademarks